United States Patent

[11] 3,599,079

| [72] | Inventors | Peter M. Ansbro<br>North Wales;<br>Matthew C. Ryan, Lansdale; Lawrence M.<br>Yerger, Spring Mount, all of, Pa. |
|---|---|---|
| [21] | Appl. No. | 6,665 |
| [22] | Filed | Jan. 29, 1970 |
| [45] | Patented | Aug. 10, 1971 |
| [73] | Assignee | Philco-Ford Corporation<br>Philadelphia, Pa. |

[54] TEMPERATURE-CONTROLLED VOLTAGE REGULATOR
11 Claims, 1 Drawing Fig.

[52] U.S. Cl. .................................................. 322/23,
320/36, 322/28, 322/33, 323/20, 323/22 T, 323/68
[51] Int. Cl. ................................................. H02h 3/28,
H02p 9/30
[50] Field of Search .......................................... 320/35, 36,
64; 322/23, 24, 28, 33, 73; 317/31; 323/4, 9,
16—22, 68, 69, 38

[56] References Cited
UNITED STATES PATENTS
3,121,837  2/1964  Holm et al. ................... 322/33 X
3,496,447  2/1970  Thompson .................... 322/23
3,522,482  8/1970  Thompson .................... 317/31

*Primary Examiner*—Gerald Goldberg
*Attorney*—Herbert Epstein

ABSTRACT: A temperature-controlled automobile voltage regulator comprising an emitter-coupled bistable circuit responsive to the alternator voltage for operating a current switch which so controls the current in the generator's field winding that the alternator voltage bears a predetermined desired relationship to the ambient temperature of the regulator over a wide range of temperatures. A buffer stage, comprising an emitter-follower transistor amplifier, provides interstage coupling between the input and output stages of the bistable circuit. A temperature responsive circuit, comprising a transistor whose emitter-collector circuit is connected across part of the emitter resistance of the buffer stage, lowers the emitter resistance of the buffer stage as ambient temperature rises, thereby lowering the switching voltages of the bistable circuit. As a result the average current supplied by the current switch to the field winding of the alternator decreases, lowering the alternator's output voltage as temperature rises, thereby to provide optimum battery charging.

PATENTED AUG 10 1971
3,599,079
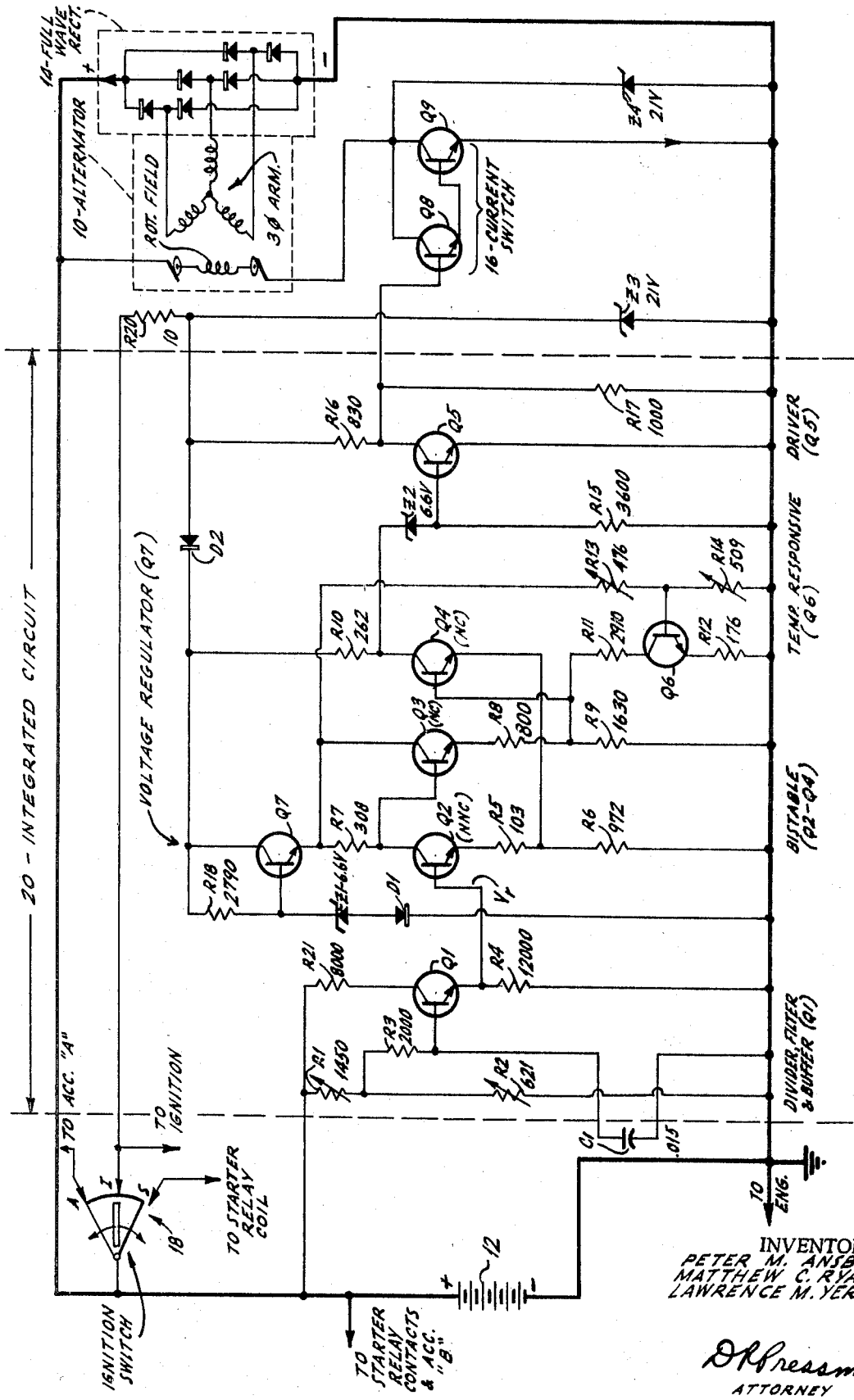
INVENTORS
PETER M. ANSBRO
MATTHEW C. RYAN
LAWRENCE M. YERGER
D R Pressman
ATTORNEY

3,599,079

TEMPERATURE-CONTROLLED VOLTAGE REGULATOR

BACKGROUND OF THE INVENTION

The advent of economical and compact solid-state rectifiers several years ago has enabled the automobile's DC generator to be replaced by an AC generator or alternator. The necessary rectifiers for the alternator usually are included within the housing of the alternator usually are included within the housing of the alternator. The alternator and its rectifiers provide many important advantages, viz: ability to provide a charging voltage at idling speeds, compact size, ability to use simple, trouble-free slip rings instead of segmented commutators, inherently limited maximum output current, and ability to prevent battery drain from reverse current flow through the alternator. The last two advantages have eliminated the need for the overcurrent and reverse current relays in the formerly used three-relay generator regulator. However since an alternator, like its DC counterpart, will provide an excessive output voltage if not controlled, some form of overvoltage regulation still is required.

In older automobiles which employed a DC generator, the regulator included an overvoltage relay which controlled the duty cycle of the generator's field coil current in order to regulate the generator's output voltage. In present-day automobiles which employ alternators, overvoltage regulation is provided by a relay or by a solid-state circuit which, without moving parts, performs the same function as the overvoltage relay. Generally, however, neither an overvoltage relay nor the equivalent solid-state circuits are responsive to ambient temperature. Thus the alternator's regulated output voltage will remain substantially constant whether the automobile is operated in tropical or in arctic climates.

As will be recognized by those skilled in the design of storage batteries, this type of regulation is undesirable and injurious to battery longevity. Battery manufacturers recommend that charging voltages should be decreased at higher temperatures; otherwise battery grid corrosion rates will be high, thereby drastically shortening battery life. In fact the single greatest cause of battery failure is positive grid corrosion, which is caused by excessive overcharging.

Accordingly one object of the present invention is to provide an automobile alternator regulator which, in addition to limiting the alternator's output voltage, also controls said output voltage as a function of temperature in order to reduce the alternator's output voltage as temperature increases, thereby to increase battery longevity. Other objects of the invention are to provide an integrated circuit voltage regulator of sufficiently compact size to be mounted on the automobile's alternator voltage precisely, to provide a voltage regulator which is relatively insensitive to input noise, to provide a temperature controlled voltage regulator which is cost-competitive with previous alternator regulators, and to provide a voltage regulator which is extremely simple and reliable in operation. Further objects and advantages of the present invention will become apparent from a consideration of ensuing description thereof.

BRIEF DESCRIPTION OF THE DRAWING

The single FIGURE of drawing shows a schematic diagram of a voltage regulator according to the present invention, together with a schematic diagram of an interconnected alternator, storage battery, and automobile ignition switch. Exemplary component values are indicated in the drawing. The various resistances indicated are in ohms, the capacitance indicated for capacitor C1 is in microfarads, and the voltage indicated adjacent each Zener diode is the reverse breakdown voltage of that diode.

DESCRIPTION OF THE PREFERRED EMBODIMENT

An alternator 10, whose voltage is to be regulated for the proper charging of a battery 12, comprises a three-phase armature and a rotatable field winding; the average current in the field winding is varied to control the output voltage of the armature. The three output terminals of the armature are connected to a full-wave rectifier 14 comprising six diodes which typically are incorporated within the housing of alternator 10. The positive output terminal of rectifier 14 is connected directly to the positive terminal of battery 12, and the negative terminal of rectifier 14 is connected directly to the negative terminal of battery 12 which is connected in turn to the engine and frame of the automobile (not shown), i.e., to "ground". One terminal of the field winding of alternator 10 is connected by a slip ring to the positive terminal of rectifier 14, and the other terminal of said winding is connected by another slip ring to ground by way of a solid state current switch 16.

The positive terminal of battery 12 is connected to the starter relay contacts, to the ignition switch 18, and to the automobile's "B" accessories (i.e., those such as the lights and horn which are not controlled by the ignition switch). Switch 18 is shown in the "on" position where it provides a connection from battery 12 to the ignition coil and the automobile's "A" accessories (i.e., those such as the radio and instruments which are controlled by the ignition switch).

Also connected to the positive and negative terminals of battery 12 is the voltage regulator of the invention. The elements of the regulator comprise a capacitor C1 and four silicon chips, viz: a monolithic integrated circuit (IC) 20, Zener diode Z3, Zener diode Z4, and current switch 16. All of these elements may be mounted on appropriate heat sinks within a package (not shown) about 1 inch×1½inch×½ inch, which in turn may be mounted directly on alternator 10.

In IC20, a voltage divider, consisting of resistors R1 and R2, is connected in series across battery 12. R1, as well as R2, preferably is made adjustable by forming it of several separate series-connected resistors within the IC chip, each of which is shorted by a fusible jumper. To trim R1 and R2 to desired values, the appropriate jumpers may be opened during production by use of appropriate fusing currents.

The junction of R1 and R2 is connected to ground by the external filter capacitor C1 which is series-connected with a load resistor R3 therefor. A buffer stage employing a transistor Q1, whose collector is connected by resistor R21 to the positive terminal of battery 12, whose emitter is connected by resistor R4 to ground, and whose base is connected to the junction of R3 and C1 senses the voltage across C1 and couples a proportional voltage $V_r$ to the base of transistor Q2.

Transistors Q2, Q3, and Q4 form part of an emitter-coupled bistable circuit, also known as a Schmitt trigger, which exhibits "hysteresis" with respect to the respective input voltages required to trigger the circuit from one stable state to the other stable state, and to trigger the circuit from that other state back to said one state. More particularly, when the input voltage $V_r$ of the bistable circuit is not present or is below a first threshold voltage V1, the bistable circuit will stay in one stable state wherein Q2 is nonconductive and Q3 and Q4 are conductive. Since this stable state exists when no input voltage $V_r$ is supplied to the regulator, it is termed a "normal" state; thus Q2 is labeled "NNC" (normally nonconductive), while Q3 and Q4 are labeled "NC" (normally conductive).

When $V_r$ rises to the first threshold voltage V1, which is more positive than a second threshold voltage V2, the bistable circuit will switch to its other stable state (Q2 on, Q3 off, and Q4 off). When $V_r$ subsequently falls below first threshold voltage V1 toward the second, less positive threshold voltage V2, the bistable circuit remains in said other stable state until $V_r$ becomes equal to V2. At that time the circuit switches to its "normal" state. Thus when the input voltage is between but not inclusive of V1 and V2, the bistable circuit may be in either stable state.

The emitter of Q2 is connected to ground by series-connected resistors R5 and R6 and the collector of Q2 is connected to the emitter of a voltage regulating transistor Q7 by a load resistor R7. The base of Q7 is connected to ground by a Zener diode Z1, which always is in a reverse breakdown state during circuit operation, and a conventional forward-biased diode D1. Diodes D1 and Z1 together establish and maintain a fixed voltage at the base of Q7. The base of Q7 also is connected to its collector by a resistor R18 and the collector of Q7 is in turn connected to the ignition terminal of switch 18 by way of diode D2 and an external power resistor R20, which may be a resistance wire. Since its base voltage is maintained constant, Q7 serves to supply a substantially constant voltage from its emitter. Diode D2 serves to prevent sneak paths within the regulator circuit, and resistor 20 cooperates with power Zener diode Z3 to limit the amplitude of transients which may arise in the ignition circuit.

The base of Q3 is connected directly to the collector of Q2, the collector of Q3 is connected directly to the emitter of Q7, and the emitter of Q3 is connected to ground by series-connected resistors R8 and R9. The base of Q4 is connected to the junction of R8, R9, and R11; the emitter of Q4 is connected to ground by resistor R6 which is common to the emitter circuits of Q2 and Q4, and the collector of Q4 is connected through R10 to a positive bias terminal at the cathode of diode D2.

A temperature-regulating circuit comprising transistor Q6 is connected across resistor R9. The collector of Q6 is connected to the junction of resistors R8, R9, and the base of Q4 by resistor R11 and the emitter of Q6 is connected to ground by resistor R12. The base of Q6 is connected to the regulated positive bias terminal at the emitter of Q7 by resistor R13 and to ground by resistor R14. R13 and R14 may be made adjustable in the same manner, previously described, as R1 and R2 are made adjustable.

The output of the bistable circuit, taken at the collector of Q4, is connected by way of a level-shifting Zener diode Z2 to the base of a driver transistor Q5. R15, which connects the anode of Z2 and the base of Q5 to ground, is a load resistor of Z2. The emitter of Q5 is connected directly to ground and its collector is connected to a positive bias terminal (the lower terminal of R20) by a load resistor R16 and to ground by a leakage compensating resistor R17. The output of Q5, taken at its collector, is also connected to a Darlington-type current switch 16.

Current switch 16 comprises transistor Q8 and Q9 whose collectors are commonly connected to the lower terminal of the field winding of alternator 10. The base of Q9 is connected to the emitter of Q8 and the emitter of Q9 is connected to ground. When Q8 and Q9 turn off, the energy present in the rotating field would normally generate a very high voltage which might damage Q8 and Q9 were it not for a protective power Zener diode Z4 which is connected across the collector-emitter circuit of Q9. Diode Z4, which breaks down due to the voltage surge from the field winding of alternator 10 whenever current switch 16 turns off, limits the voltage across the collector-emitter path of Q9 to the Zener breakdown voltage.

OPERATION

The output voltage of alternator 10 is translated to a proportional, but lower, voltage by the voltage divider R1–R2. This lower voltage is filtered by C1 and buffered by the stage including Q1, providing the reference voltage $V_r$ at the base of Q2.

When the alternator voltage is such that $V_r$ is below V1, the upper threshold voltage of the bistable circuit, $V_r$ is insufficient to turn Q2 on, but Q3 is turned on by the positive voltage applied to its base via R7, and Q4 is turned on by the positive voltage applied to its base from the emitter of Q3. Since Q4 is turned on, the voltage at its collector is relatively low and insufficient to break down Z2. Hence the voltage at the base of Q5 is substantially at ground so that Q5 is nonconductive. The collector voltage of Q5 therefore is high, causing Q8 and Q9 to saturate. Thus switch 16 is on, allowing current to flow through the field winding of alternator 10. The current through the rotating field winding causes a strong magnetic field to thread the windings of the armature, causing the output voltage of alternator 10 to increase.

When the alternator's output voltage increases to a sufficiently high level, the voltage at the upper terminal of R1 becomes sufficient to raise $V_r$ above V1. This causes Q2 to turn on. The collector voltage of Q2 begins to fall, reducing the forward bias and hence the collector-emitter current of Q3, which in turn reduces the forward bias on Q4. The collector-emitter current of Q4 decreases more rapidly than the collector-emitter current of Q2 increases because the base voltage of Q4 falls faster than the base voltage of Q2 rises due to voltage amplification provided by Q2. Hence during transition from one bistable state to the other, the net current through the common resistor R6 decreases, thereby lowering the emitter potential of Q2 so as to accelerate the turn-on of Q2 through positive feedback. This accelerated turn-on of Q2 is coupled to Q3 and Q4 and back to Q2 as aforedescribed so that, through regenerative action, the circuit switches rapidly to its other stable state as soon as $V_r$ exceeds V1.

When Q4 turns off, its collector potential rises, breaking down Z2 which then couples a positive voltage to turn on Q5. As Q5 turns on, its collector potential falls to near ground, turning off Q8 and Q9 of current switch 16. This increases greatly the impedance in series with field winding of alternator 10, thereby decreasing substantially the current in said winding. This causes the output voltage of alternator 10 to fall.

Despite the fall in the output voltage of alternator 10 and the concomitant fall in the value of $V_4$, transistors Q2, Q3 and Q4 of the bistable circuit remain in the last-described state until $V_r$ falls to the lower threshold voltage V2. When that occurs, $V_r$ turns off Q2 and turns on Q3 and Q4 through regenerative action in a direction opposite to that aforedescribed.

The presence of resistor R5 in the emitter circuit of Q2 insures that the bistable circuit will have relatively widely separated upper and lower threshold levels V1 and V2. Such wide separation insures that small noise pulses will not trigger the bistable circuit and thereby the capacitance of C1 need not be large enough to suppress those small noise pulses. The difference between the upper and lower threshold levels, when translated to the potential at the positive terminal of battery 12, is about 300 mv., whereby typical lower and upper thresholds at the positive terminal of battery 12 will be 13 and 13.3 v., respectively.

Returning to the operation of the bistable circuit, as Q2 turn off and Q3 and Q4 turns on, the potential at the collector of Q4 falls, thereby removing the reverse breakdown voltage on Z3, whereby the impedance of Z2 rises greatly, lowering the potential at the base of Q5. As a result Q5 turns off, whereby its collector potential rises, turning on current switch 16 and thereby causing the field winding current in alternator 10 to increase. Thus the cycle of events aforedescribed is repeated.

In practice it has been found that switch 16 operates at about 50—800 Hz. and that the current through the field winding of alternator 10 varies from about 2 to 4 amperes DC.

In order to obtain optimum battery charging as aforementioned, the regulated voltage should have a negative temperature coefficient, i.e., as ambient temperature rises, the regulated voltage should decrease. This function is provided by the circuit including Q6 as follows.

As is well known, the base-emitter voltage of a transistor decreases in proportion to ambient temperature. Hence as ambient temperature rises, the base-emitter voltage of Q6 also decreases and causes Q6 to become conductive. When Q6 becomes conductive, a resistance (the sum of the resistances of R11, R12, and the emitter-collector path of Q6) is placed in shunt with R9, the emitter resistor of Q3, thereby effectively decreasing R9. This changes the ratio of voltage division provided by the collector-emitter circuit of Q3, R8, and R9 so that, under any given conditions, the base voltage of Q4 is lowered when Q6 turns on. Thus a higher voltage at the collector of Q2 will be required to turn Q4 on, which in turn enables a lower $V_r$ to turn Q4 on. Thus V2, the lower threshold voltage of the bistable circuit, is lowered when Q6 turns on. Because the base voltage of Q4 is lowered when Q6 turns on, Q4 (when conductive) supplies a correspondingly smaller emitter current to resistor R6. Hence the emitter voltage of nonconductive transistor Q2 falls. Therefore the minimum voltage required to be applied to the base of Q2 to turn it on and thereby cause Q4 to be cut off, i.e. the upper threshold voltage V1, is correspondingly lowered. Thus the effect of lowering the value of R9 through the action of Q6 lowers both V1 and V2 so that the regulated voltage of alternator 10 is lowered when Q6 turns on.

The parameters are adjusted so that temperature-responsive transistor Q6 first becomes conductive at about room temperature. Thus the output voltage of alternator 10 is inversely proportional to ambient temperature levels and above. For ambient temperatures below such levels, the output voltage of alternator 10 is substantially constant. By so controlling the charging voltage of battery 12, its life can be increased substantially.

In lieu of the temperature-responsive circuit including Q6, any other temperature-sensitive means which changes the voltage coupled from the collector of Q2 to the base of Q4 as a function of ambient temperature may be used. For example a thermistor circuit may be substituted for the circuit including Q6.

We claim:

1. In a voltage-sensitive bistable circuit of the type comprising:

a first transistor having an emitter, a collector and a base of a given conductivity type; a reference potential terminal; first resistive means for applying a unidirectional operating voltage to said collector, and second resistive means connecting said emitter to said reference potential terminal, a second transistor having an emitter, a collector and a base of said given conductivity type; third resistive means for applying a unidirectional operating voltage to said collector of said second transistor, at least a part of said second resistive means also connecting said emitter of said second transistor to said reference potential terminal, and coupling means for supplying a part of the unidirectional voltage at said collector of said first transistor to said base of said second transistor, said part having a ratio relation to said unidirectional collector voltage, the improvement wherein said coupling means comprises means responsive to changes in its temperature, within a given temperature range, to change said ratio relation.

2. A circuit according to claim 1, wherein said coupling means comprises a transistor of said given conductivity type connected in emitter-follower configuration.

3. In a voltage-sensitive bistable circuit of the type comprising:

a first transistor having an emitter, a collector, and a base of a given conductivity type; a reference potential terminal; first resistive means for applying a unidirectional operating voltage to said collector, and second resistive means connecting said emitter to said reference potential terminal, a second transistor having an emitter, a collector and a base of said given conductivity type; third resistive means for applying a unidirectional operating voltage to said collector of said second transistor, at least a part of said second resistive means also connecting said emitter of said second transistor to said reference potential terminal, and coupling means for supplying a part of the unidirectional voltage at said collector of said first transistor to said base the improvement wherein said coupling means comprises a coupling transistor having an emitter, a collector and a base of said given conductivity type; fourth resistive means connecting said emitter of said coupling transistor to said reference potential terminal; means direct coupling said emitter of said coupling transistor to said base of said second transistor; means direct coupling said collector of said first transistor to said base of said coupling transistor; means for applying a unidirectional operating voltage to said collector of said coupling transistor; and means responsive to changes in its temperature within a given temperature range, to change said ratio relation, said temperature-change-responsive means comprising means for variably shunting said fourth resistive means in response to said changes in temperature.

4. A circuit according to claim 3, wherein said fourth resistive means comprises a first resistive element and a second resistive element, said elements being connected at a junction, each of said elements having a terminal other than said junction, means connecting said terminal of said first resistive element to said emitter of said coupling transistor, and means connecting said terminal of said second resistive element to said reference potential terminal, said means direct coupling said emitter of said coupling transistor to said base of said second transistor comprises means connecting said junction to said base of said second transistor, and said temperature-change-responsive means is connected in shunt relationship with at least a portion of said second resistive element and is responsive to changes of temperature within said given temperature range to decrease its resistance as said temperature rises.

5. A circuit according to claim 3 wherein said temperature-responsive means comprises a temperature-responsive transistor, the emitter-collector circuit thereof being connected across at least a part of said fourth resistive means, the base thereof being connected to said reference potential terminal by a first bias resistor and to a bias potential terminal by a second bias resistor.

6. A circuit according to claim 4, wherein said temperature-change-responsive means comprises a temperature-responsive transistor having an emitter, a collector and a base of said given conductivity type, resistive means for connecting the emitter-collector path of said temperature-responsive transistor between said junction and said reference potential terminal; and means for applying an operating bias to said base of said temperature-responsive transistor.

7. In a voltage-regulator circuit for an electrical generator having a field winding and adapted to produce an output voltage having a magnitude dependent on the duty cycle of a pulsating electric current flowing through said field winding, said circuit being of the type comprising:

a. an emitter-coupled voltage-sensitive bistable circuit comprising i. a first transistor having an emitter, a collector and a base of a given conductivity type; a reference potential terminal; first resistive means for applying a unidirectional operating voltage to said collector, and second resistive means connecting said emitter to said reference potential terminal, ii. a second transistor having an emitter, a collector and a base of said given conductivity type; third resistive means for applying a unidirectional operating voltage to said collector of said second transistor, at least a part of said second resistive means connecting said emitter of said second transistor to said reference potential terminal, and iii. coupling means for supplying a part of the unidirectional voltage at said collector of said first transistor to said base of said second transistor, said b. means for applying a given portion of said generator output voltage between said base of said first transistor and said reference potential terminal in such polarity that increases in said magnitude of said output voltage are in a direction to drive said first transistor, when nonconductive, into conduction, and c. a current switch responsive to the collector potential of said second transistor for controlling said duty cycle of current flowing through said field winding, the improvement wherein said coupling means of said bistable circuit comprises means responsive to changes in its temperature, within a given temperature range, to change said ratio relation.

8. In a voltage-regulator circuit for an electrical generator having a field winding and adapted to produce an output voltage having a magnitude dependent on the duty cycle of a pulsating electric current flowing through said field winding, said circuit being of the type comprising:

a. an emitter-coupled voltage-sensitive bistable circuit comprising
   i. a first transistor having an emitter, a collector and a base of a given conductivity type; a reference potential terminal; first resistive means for applying a unidirectional operating voltage to said collector, and second resistive means connecting said emitter to said reference potential terminal.
   ii. a second transistor having an emitter, a collector and a base of said given conductivity type; third resistive means for applying a unidirectional operating voltage to said collector of second transistor, at least a part of said second resistive means connecting said emitter of said second transistor to said reference potential terminal, and
   iii. coupling means for supplying a part of the unidirectional voltage at said collector of said first transistor, said part having a ratio relation to said unidirectional collector voltage, b. means for applying a given portion of said generator output voltage between said base of said first transistor and said reference potential terminal in such polarity that increases in said magnitude of said output voltage are in a direction to drive said first transistor, when nonconductive, into conduction, and c. a current switch responsive to the collector potential of said second transistor for controlling said duty cycle of current flowing through said field winding, the improvement wherein said coupling means of said bistable circuit comprises a coupling transistor having an emitter, a collector and a base of said given conductivity type; fourth resistive means connecting said emitter of said coupling transistor to said reference potential terminal; means direct coupling said emitter of said coupling transistor to said base of said second transistor; means direct coupling said collector of said first transistor to said base of said coupling transistor; means for applying a unidirectional operating voltage to said collector of said coupling transistor; and means responsive to changes in its temperature, within a given temperature range, to change said ratio relation, said temperature-change-responsive means comprising means for variably shunting at least a portion of said fourth resistive means in response to said changes in temperature.

9. A circuit according to claim 8, wherein
said fourth resistive means comprises a first resistive element and a second resistive element, said elements being connected at a junction, each of said elements having a terminal other than said junction, means connecting said terminal of said first resistive element to said emitter of said coupling transistor, and means connecting said terminal of said second resistive element to said reference potential terminal,
said means direct coupling said emitter of said coupling transistor to said base of said second transistor comprises means connecting said junction to said base of said second transistor, and
said temperature-change-responsive means is connected in shunt relationship with at least a portion of said second resistive element and is responsive to changes of temperature within said given temperature range to decrease its resistance as said temperature rises.

10. A circuit according to claim 9, wherein said temperature-change-responsive means comprises a temperature-responsive transistor having an emitter, a collector and a base of said given conductivity type, fifth resistive means for connecting the emitter-collector path of said temperature-responsive transistor in shunt relationship with at least a portion of said second resistive element, and means for applying an operating bias to said base of said temperature-responsive transistor.

11. A circuit according to claim 10, wherein
said fifth resistive means comprises sixth resistive means connecting said emitter of said temperature-responsive transistor to said reference potential terminal, and seventh resistive means connecting said collector of said temperature-responsive transistor to said junction,
said means for applying said operating bias to said base of said temperature-responsive transistor comprises first bias resistor means connecting said base of said temperature-responsive transistor to said reference potential terminal and second bias resistor means connecting said base of said temperature-responsive transistor to a bias voltage terminal, and
said circuit additionally comprises means for regulating said unidirectional operating voltages respectively applied to said collector of said first transistor and said collector of said coupling transistor and said operating bias applied said base of said temperature-responsive transistor.

PO-1050
(5/69)

UNITED STATES PATENT OFFICE
CERTIFICATE OF CORRECTION

Patent No. 3,599,079                    Dated  August 10, 1971

Inventor(s)  Peter M. Ansbro et al.

It is certified that error appears in the above-identified patent and that said Letters Patent are hereby corrected as shown below:

Column 4, line 32, "$V_4$" should read -- $V_r$ --.

Column 4, line 49, after "$Q_2$", "turn" should read -- turns --.

Column 4, line 50, after "$Q_3$ and $Q_4$", "turns" should read -- turn --.

Column 6, last line, the period (.) should be changed to a comma (,).

Column 7, line 36 (the 23rd line of claim 8), the following should be inserted after "transistor":  -- to said base of said second transistor --.

Signed and sealed this 7th day of March 1972.

(SEAL)
Attest:

EDWARD M. FLETCHER, JR.                ROBERT GOTTSCHALK
Attesting Officer                       Commissioner of Patents